US012056100B1

(12) United States Patent
Atur et al.

(10) Patent No.: US 12,056,100 B1
(45) Date of Patent: Aug. 6, 2024

(54) SYSTEMS AND METHODS FOR CONVERTING DATAFRAMES TO RELATIONAL DATABASES AND/OR VICE VERSA

(71) Applicant: Snowflake Inc., Bozeman, MT (US)

(72) Inventors: Balachandran Atur, Redwood, WA (US); Hazem Elmeleegy, Sunnyvale, CA (US); Jung Lin Lee, El Dorado Hills, CA (US); Aditya G Parameswaran, Berkeley, CA (US); Devin Petersohn, Liberty, MO (US); Mahesh Shankar Vashishtha, Madison, WI (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/189,837

(22) Filed: Mar. 24, 2023

(51) Int. Cl.
  *G06F 16/21* (2019.01)
  *G06F 16/28* (2019.01)
(52) U.S. Cl.
  CPC .......... *G06F 16/213* (2019.01); *G06F 16/283* (2019.01)
(58) Field of Classification Search
  CPC .............................. G06F 16/213; G06F 16/283
  See application file for complete search history.

(56) References Cited

U.S. PATENT DOCUMENTS

| 2017/0212748 A1* | 7/2017 | Agnew | G06F 8/20 |
| 2018/0032591 A1* | 2/2018 | Priyadarshini | G06F 16/3331 |
| 2023/0020618 A1* | 1/2023 | Goyal | G06F 16/254 |

FOREIGN PATENT DOCUMENTS

| CN | 110837492 B | * 6/2021 | G06F 16/21 |

* cited by examiner

*Primary Examiner* — Hosain T Alam
*Assistant Examiner* — Anthony G Gemignani
(74) *Attorney, Agent, or Firm* — Schwegman Lundberg & Woessner, P.A.

(57) ABSTRACT

Systems and methods for converting dataframes to relational databases and/or vice versa, are disclosed. Exemplary implementations may: store information that represents a first dataframe; generate a first relation that represents the first dataframe, the first relation having a first schema; add a first ordering attribute to the set of attributes of the first relation; populate the first ordering attribute with numbers in accordance with a row numbering of the first dataframe; perform a relational database operation on the first relation that modifies the first relation into a second relation; create a second dataframe based on the second relation such that the row labels and the order of the rows are preserved for the (remaining) records and attributes of the second relation; and/or perform other steps.

20 Claims, 8 Drawing Sheets

15a

- Column domains 15d
- Column labels 15c

[1,1]  [3,1]  T — Row 1
       0.5  F — Row 2
[1,3]  k  0.2  T — Row 3
       g  0.3 — Row 4
       b — Row 5

Table 15t

Column 1
Column 2
Column 3
Column 4
Column 5

Row labels 15r

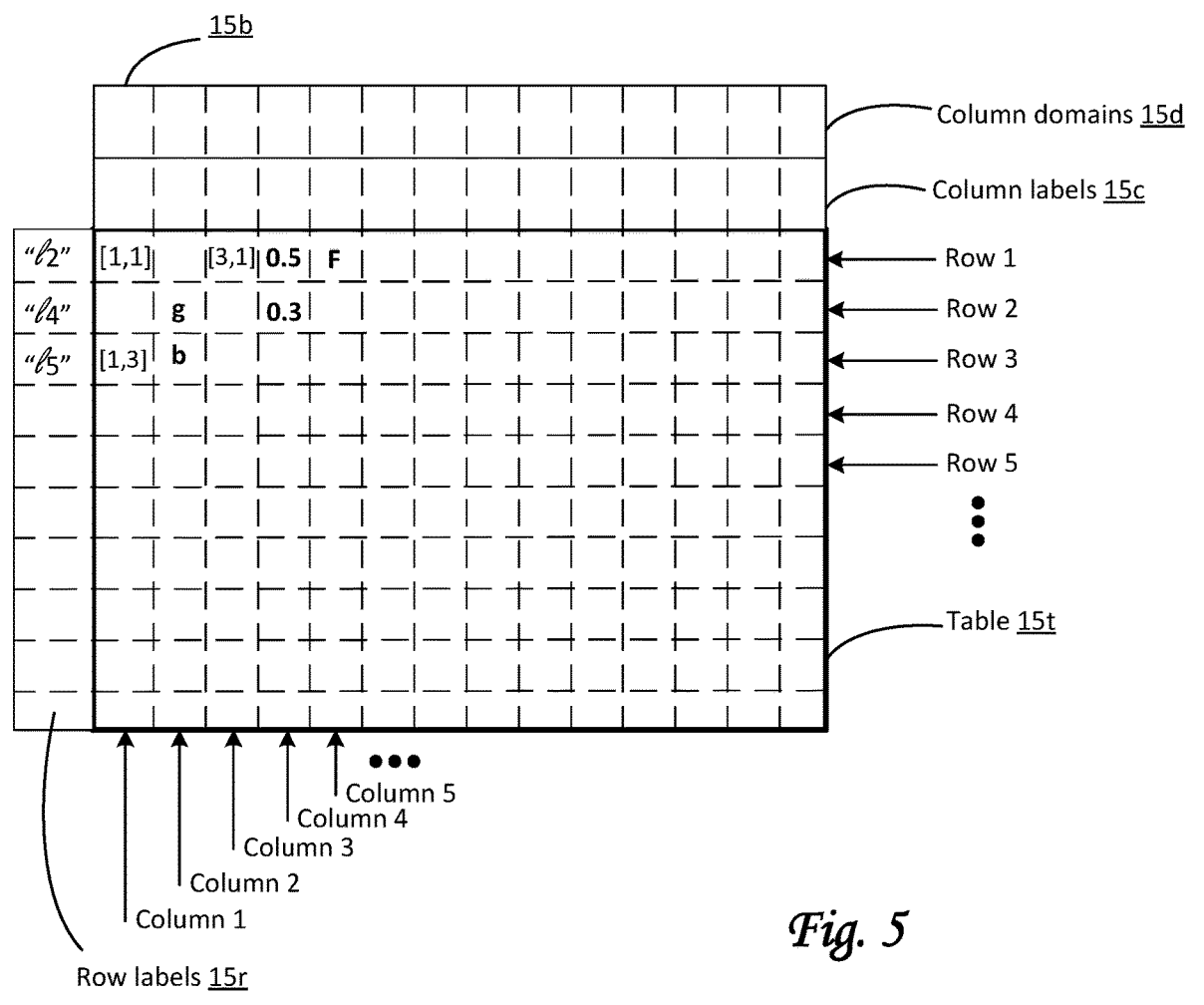

Column domains 15d
Column labels 15c

| "ℓ2" | [1,1] | | [3,1] | 0.5 | F |
| "ℓ4" | | g | | 0.3 | |
| "ℓ5" | [1,3] | b | | | |

Row 1
Row 2
Row 3
Row 4
Row 5
⋮

Table 15t

Column 1
Column 2
Column 3
Column 4
Column 5
⋯

Row labels 15r

*Fig. 5*

SYSTEMS AND METHODS FOR CONVERTING DATAFRAMES TO RELATIONAL DATABASES AND/OR VICE VERSA

FIELD OF THE DISCLOSURE

The present disclosure relates to systems and methods for converting dataframes to relational databases and/or vice versa, and, in particular, supporting queries and operations on either.

BACKGROUND

Dataframes are known. Relational databases are known, as are relational database operations or queries. Open-source software library "PANDAS" is known to provide an Application Programming Interface (API) used for dataframe queries. Structured Query Language (SQL) is a known standard for relational database operations.

SUMMARY

One aspect of the present disclosure relates to a system configured to convert dataframes to relational databases and/or vice versa. As used herein, the term "relational database" is used interchangeably with the term "relation". The system may electronic storage, one or more processors, and/or other components. The system may store information that represents a first dataframe. The system may generate a first relation that represents the first dataframe, the first relation having a first schema. The system may add a first ordering attribute to the set of attributes of the first relation. The system may populate the first ordering attribute with numbers in accordance with a row numbering of the first dataframe. The system may perform a relational database operation on the first relation that modifies the first relation into a second relation. The system may create a second dataframe based on the second relation such that the row labels and the order of the rows are preserved for the (remaining) records and attributes of the second relation. In some implementations, the system may perform one or more other steps.

Another aspect of the present disclosure relates to a method of converting dataframes to relational databases and/or vice versa. The method may include storing information that represents a first dataframe. The method may include generating a first relation that represents the first dataframe, the first relation having a first schema. The method may include adding a first ordering attribute to the set of attributes of the first relation. The method may include populating the first ordering attribute with numbers in accordance with a row numbering of the first dataframe. In some implementations, the method may include performing a relational database operation on the first relation that modifies the first relation into a second relation. The method may include creating a second dataframe based on the second relation such that the row labels and the order of the rows are preserved for the (remaining) records and attributes of the second relation. In some implementations, the method may include one or more other steps.

As used herein, any association (or relation, or reflection, or indication, or correspondency) involving dataframes, relations, schemas, attributes, records, rows, columns, labels, types, values, operations, queries, modifications, instructions, presentations, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof. As used herein, the terms "connect" and "couple" (and derivatives thereof) may be used interchangeably to indicate a link between multiple components that may or may not include intermediary components.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3 illustrates an exemplary dataframe as may be used by a system for converting dataframes to relational databases and/or vice versa, in accordance with one or more implementations.

FIG. 5 illustrates an exemplary dataframe as may be used by a system for converting dataframes to relational databases and/or vice versa, in accordance with one or more implementations.

DETAILED DESCRIPTION

Figure 1:
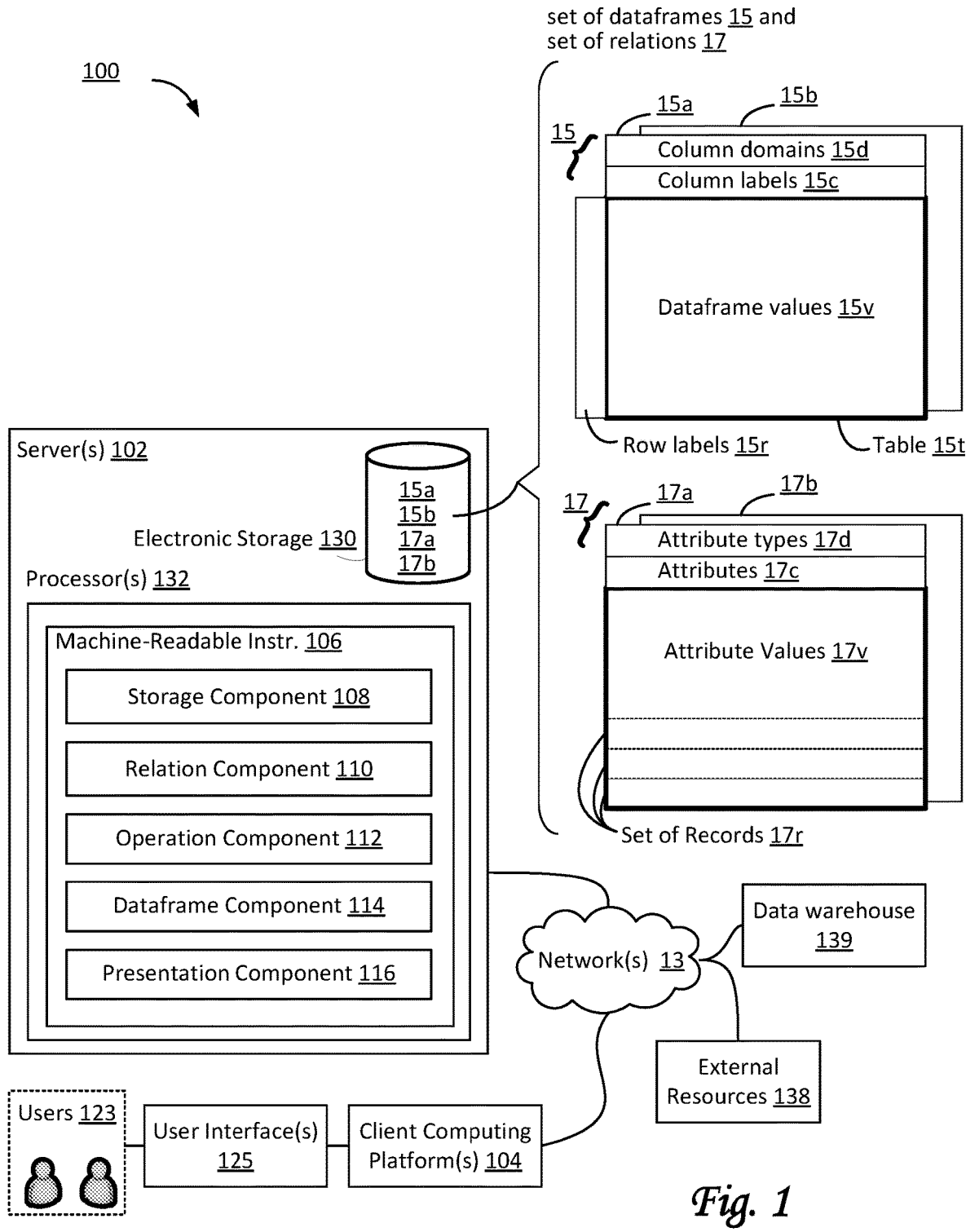
FIG. 1 illustrates a system for converting dataframes to relational databases and/or vice versa, in accordance with one or more implementations.

FIG. 1 illustrates a system 100 configured for converting dataframes to relational databases (also referred to as "relations") and/or vice versa. In some implementations, system 100 may include one or more servers 102, processors(2) 132, electronic storage 130, a set of one or more dataframes 15, a set of one or more relations 17 (also referred to as relational databases 17), a data warehouse 139, client computing platforms 104, user interfaces 125, external resources 138, and/or other components. One or more users 123 of system 100 may use system 100 in many (professional) contexts involving data science, exploratory data analysis (EDA), data mining, genomics, matrix calculations, machine learning, statistics, and/or other contexts. As used in descriptions herein, any use of the term "user" may refer to user(s) 123, unless indicated otherwise. System 100 supports converting a dataframe to a relation and back to another dataframe. System 100 also supports converting a relation to a dataframe and back to another relation.

In some implementations, server(s) 102 may be configured to communicate with one or more client computing platforms 104 according to a client/server architecture and/or other architectures. In some implementations, client computing platform(s) 104 may be configured to communicate with other client computing platforms via server(s) 102, wherein the communication uses a peer-to-peer architecture and/or other architectures. Users may access system 100 via client computing platform(s) 104. In some implementations, system 100 and/or components thereof may be configured to communicate with one or more of users 123, and/or other entities and/or components, e.g., through one or more networks 13.

Server(s) 102 may include electronic storage 130, (hardware) processor(s) 132, machine-readable instructions 106, and/or other components. Server(s) 102 may be configured by machine-readable instructions 106. Machine-readable instructions 106 may include one or more instruction components. Instruction components (for any set of machine-readable instructions) may include computer program components. The instruction components may include one or more of a storage component 108, a relation component 110, an operation component 112, a dataframe component 114, a presentation component 116, and/or other instruction components.

Storage component 108 may be configured to electronically store and retrieve information, e.g., in electronic storage 130 or in data warehouse 139. The stored information may represent one or more dataframes (e.g., a set of dataframes 15, including a first dataframe 15a, a second dataframe 15b, and so forth), one or more relations (e.g., a set of relations 17, including a first relation 17a, a second relation 17b, and so forth), and/or other information. A particular dataframe (e.g., dataframe 15a) may include a two-dimensional, ordered, table 15t of dataframe positions (also referred to as "table positions", or simply "positions") that contain dataframe values. The two dimensions may include a first dimension of columns and a second dimension of rows. The particular dataframe may further include one or more sets of row labels 15r, a set of column labels 15c, a set of column domains 15d (also referred to as "column types": if specified, a domain defines a set of possible values for an individual column, and these domains may be part of the schema of the dataframe), and/or other information. Examples of column domains include integers, floating point numbers, Boolean values, strings, datetimes, etc. The rows in a particular dataframe may be ordered according to a row ordering, which may be implicit based on the position within (ordered) table 15t. For example, rows of a dataframe (or another type of ordered two-dimensional table of data) may be identified by a row number (see, e.g., FIG. 3, using sequential row numbers). In other words, a dataframe may be defined as a tuple of {table 15t, row labels 15r, column labels 15c, domains 15d}. Commonly, individual column labels are unique in the set of column labels 15c such that column labels can be used as identifiers for operations and/or queries. In some implementations, individual row labels may be unique in the set of row labels 15r. Some dataframes may have multiple row labels. Typically, dataframes are assumed to have ordered rows, or, in other words, a set of rows that has a particular row ordering. Certain other types of two-dimensional data, including relations, are not by default assumed to have a similar type of ordering, but instead may appears to have random row ordering.

By way of non-limiting example, FIG. 3 illustrates first dataframe 15a as may be used by system 100. As depicted, first dataframe 15a includes table 15t with two dimensions of dataframe positions that contain dataframe values 15v. For example, the left-to-right dimension of rows may start at the top with Row 1, followed by Row 2, Row 3, Row 4, Row 5, and so forth going down. For example, the top-to-bottom dimension of columns may start on the left side with Column 1, followed by Column 2, Column 3, Column 4, Column 5, and so forth going to the right side. Individual dataframe positions accordingly may be identified by "x"-"y" coordinates (with "x" corresponding to column number, "y" to row number). For example, as shown, the top left dataframe position may be referred to as [1,1]. The dataframe position in the top row, third column may be referred to as [3,1], and the dataframe position in the third row, top column may be referred to as [3,1]. Individual dataframe positions may have dataframe values, or may be empty. For example, dataframe position [4,2] is depicted as having dataframe value "0.5", dataframe position [4,3] has dataframe value "0.2", and dataframe position [4,4] has dataframe value "0.3". Similarly, dataframe positions [2, 3 to 5] are depicted as having dataframe values "k", "g", and "b", respectively. Similarly, dataframe positions [5, 1 to 3] are depicted as having dataframe values "T", "F", and "T", respectively. Additionally, table 15t as depicted has a set of row labels 15r, a set of column labels 15c, and a set of column domains 15d. For example, the column domain of Column 2 may be strings, the column domain of Column 4 may be floating point numbers or fractions, and the column domain of Column 5 may be Boolean values "true" and "false", indicated by "T" and "F", respectively.

Referring to FIG. 1, a particular relation (e.g., relation 17a) may have a particular schema that defines a set of attributes 17c and a corresponding set of attribute types 17d. Attribute values 17v of individual ones of set of attributes 17c may have a corresponding attribute type (from the set of attribute types 17d). The particular relation may include an unordered set of records 17r having the set of attributes 17c. Commonly, individual attributes are unique in the set of attributes 17c such that attributes can be used as identifiers for operations and/or queries.

Figure 4A:
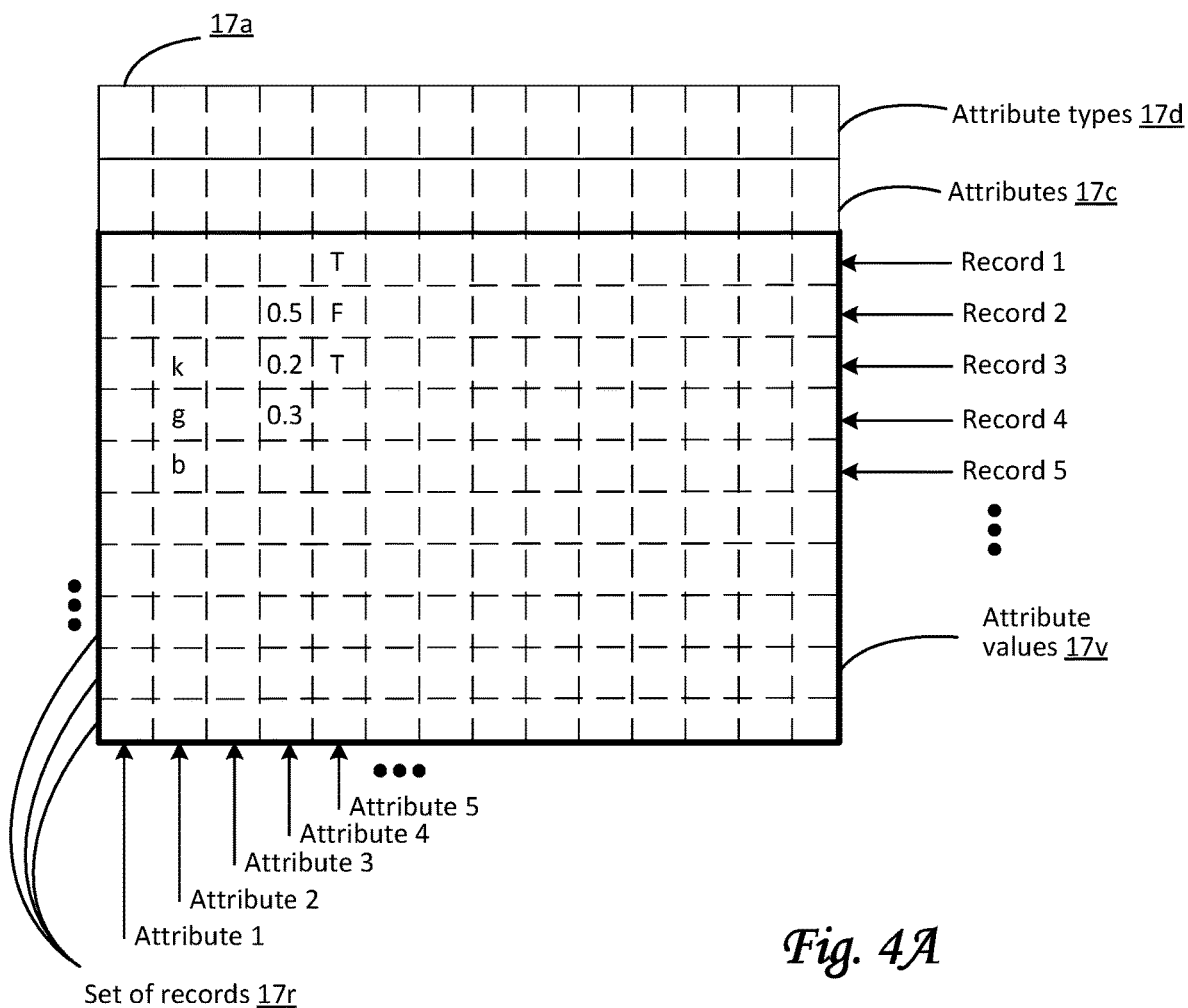
FIG. 4A illustrates an exemplary relation as may be used by a system for converting dataframes to relational databases and/or vice versa, in accordance with one or more implementations.

Relation component 110 may be configured to generate, create, and/or modify relations. For example, see relation 17a in FIG. 1. For example, relation component 110 may generate a particular relation that represents a particular dataframe. By way of non-limiting example, FIG. 4A illustrates first relation 17a as may have been generated by relation component 110 to represent dataframe 15a of FIG.

3. In FIG. 4A, individual records in set of records 17r may correspond to individual rows of dataframe 15a, such that attribute values 17v within set of records 17r are determined, based on, and/or otherwise derived from dataframe values 15v contained in the corresponding rows of table 15t. Set of attributes 17c may correspond to set of column labels 15c of dataframe 15a. Corresponding set of attribute types 17d may correspond to set of column domains 15d of dataframe 15a. As a result of generating first relation 17a, individual dataframe values in dataframe 15a will be part of attribute values 17v of first relation 17a. For example, the set of records 17r may include, starting at the top, Record 1, followed by Record 2, Record 3, Record 4, Record 5, and so forth going down. For example, set of attributes 17c may including, starting on the left side, Attribute 1, followed by Attribute 2, Attribute 3, Attribute 4, Attribute 5, and so forth going to the right side. As depicted, dataframe values "0.5", "0.2", "0.3", "k", "g", "b", "T", "F", and "T" from dataframe 15a are preserved as attribute values in first relation 17a. Since records in a relation may be unordered, records could be swapped around (e.g., Record 2 could be swapped with Record 4, etc.) and relation 17a would still be the same.

Figure 4B:
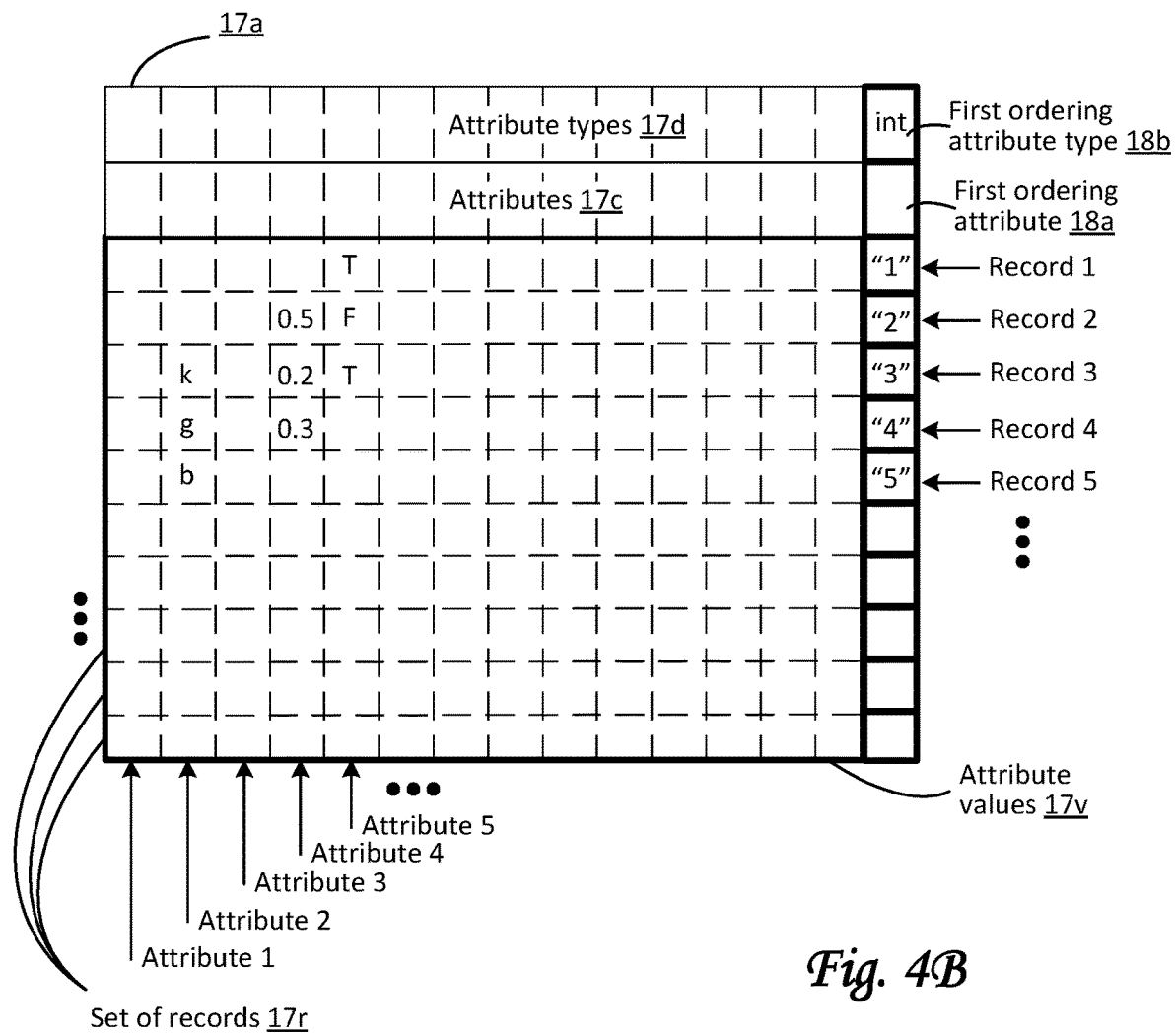
FIG. 4B illustrates an exemplary relation as may be used by a system for converting dataframes to relational databases and/or vice versa, in accordance with one or more implementations.
Figure 4C:
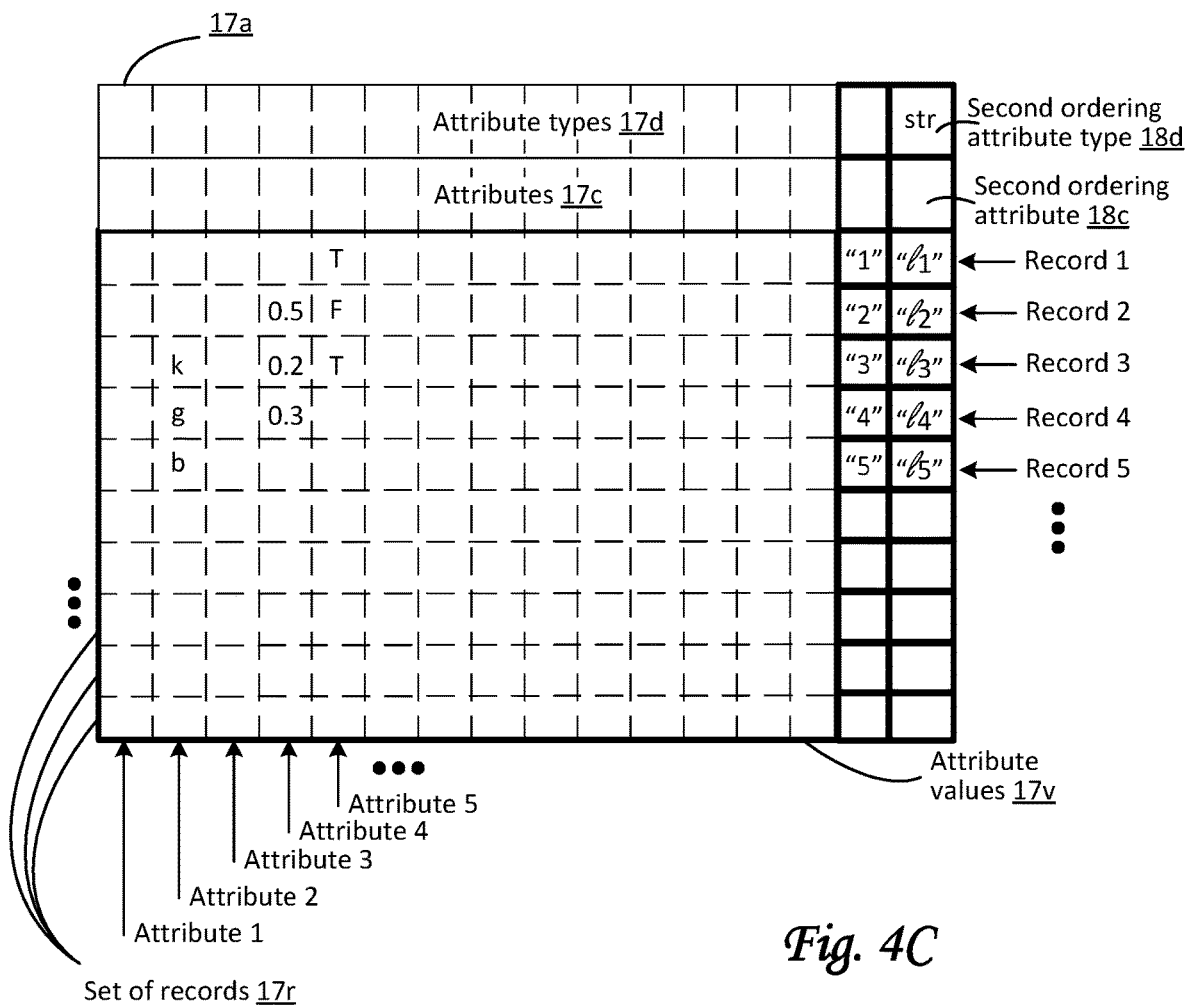
FIG. 4C illustrates an exemplary relation as may be used by a system for converting dataframes to relational databases and/or vice versa, in accordance with one or more implementations.

In some implementations, relation component 110 may be configured to add one or more ordering attributes to a relation, particularly to a newly generated relation that represents a particular dataframe. For example, relation component 110 may add a first ordering attribute 18a to set of attributes 17c as depicted in FIG. 4B. By way of non-limiting example, FIG. 4B illustrates first relation 17a as may have been modified by relation component 110. First ordering attribute 18a (e.g., "_ROW_NUMBER") may have a first ordering attribute type 18b. In some implementations, first ordering attribute type 18b is an integer (as indicated by "int") and/or another numerical type suitable for row numbers. For individual ones of the records in first relation 17a, relation component 110 may populate first ordering attribute 18a with numbers such that attribute values 17v for first ordering attribute 18a are ordered according to the (sequential) row ordering of the rows of dataframe 15a (in particular because rows in dataframes are ordered). In some implementations, relation component 110 may add one or more additional ordering attributes (e.g., second ordering attribute 18c to set of attributes 17c as depicted in FIG. 4C). By way of non-limiting example, FIG. 4C illustrates first relation 17a as may have been further modified by relation component 110. Second ordering attribute 18c (e.g., "_COL_LABEL") may have a second ordering attribute type 18d. In some implementations, second ordering attribute type 18d is a string (as indicated by "str") and/or another type suitable for row labels. For individual ones of the records in first relation 17a, relation component 110 may populate second ordering attribute 18c with labels and/or other strings such that attribute values 17v for second ordering attribute 18c correspond to the row labels of the rows of dataframe 15a (here, depicted as row labels "L1", "L2", "L3", "L4", and "L5", respectively for the row labels for Record 1 through Record 5 (with "L1" being the row label for Record 1, "L2" being the row label for Record 2, and so forth). Storage component 108 may be configured to store relation 17a (e.g., in electronic storage 130, or in data warehouse 139) after modifications by relation component 110. In some implementations, relation component 110 may be configured to add an ordering attribute to a particular relation or other table (that serves as the input data or the source of the table data) that represents an unordered table of data. In such a case, this ordering attribute may be populated with random numbers, which may subsequently be maintained and used once the particular relation has been represented as a particular dataframe.

Operation component 112 may be configured to perform relational database operations and/or queries on relations, including but not limited to first relation 17a. In some implementations, a particular relational database operation may conform to a Structured Query Language (SQL) standard. An operation or query may modify a relation into another relation. In other words, operation component 112 may generate and/or create relations by applying and/or otherwise performing operations on other relations. For example, operation component 110 may modify first relation 17a into second relation 17b. Second relation 17b may have a second schema that defines a set of attributes 17c (which may be different from first relation 17a) and a corresponding set of attribute types 17d (which may be different from first relation 17a). Second relation 17b may include an unordered set of records 17r (which may be different from first relation 17a) containing attribute values 17v (which may be different from first relation 17a). In some cases, a modification may include removing at least one record or removing at least one attribute from a particular relation. For example, after a record has been removed, second relation 17b has a set of remaining records. For example, after an attribute has been removed, second relation 17b has a set of remaining attributes, and so forth. In some implementations, relation component 110 may be configured to reorder the set of remaining records after a particular record has been removed such that the set of remaining attribute values for the first ordering attribute are ordered (or reordered) according to the row ordering, with exception of the particular record that has been removed. In some implementations, a particular relational database operation may be performed at data warehouse 139 (where dataframes and relations may be stored). In some cases, a modification may include adding at least one record or attribute. For example, adding a record may also prompt a re-numbering and/or reordering of the rows, e.g., by (re-)populating the augmented set of attribute values for the first ordering attribute. For example, grouping or sorting a set of records may also prompt a re-numbering and/or (re-)ordering of the rows.

Figure 4D:
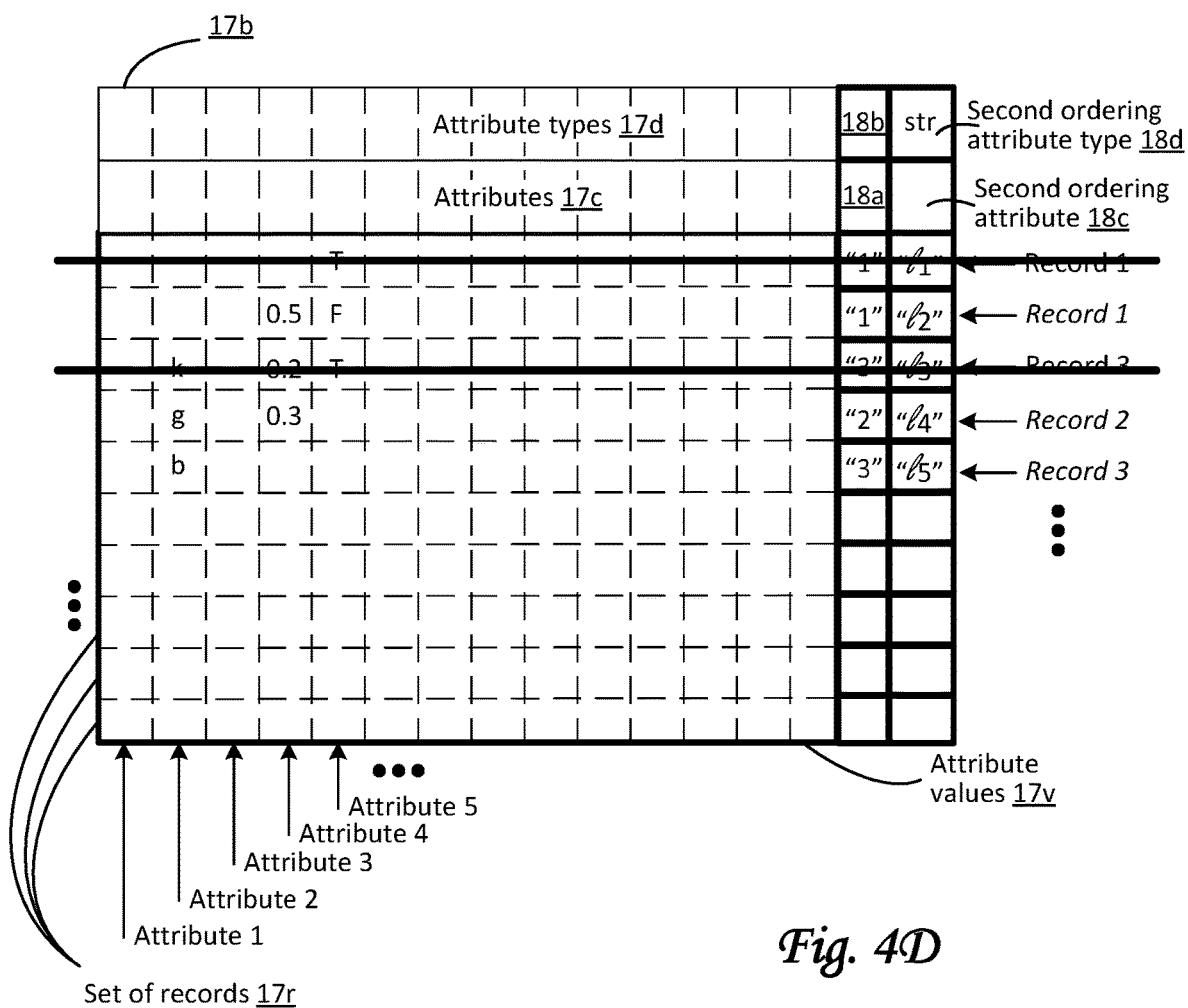
FIG. 4D illustrates an exemplary relation as may be used by a system for converting dataframes to relational databases and/or vice versa, in accordance with one or more implementations.

By way of non-limiting example, FIG. 4D illustrates second relation 17b as may have been generated by performing certain queries (e.g., "SELECT" SQL queries or "DELETE" SQL queries, etc.) on first relation 17a. As depicted in FIG. 4D by strike-through, when compared to first relation 17a in FIG. 4C, two records have been deleted: Record 1 and Record 3. The remaining records have been reordered such that former Record 2 is now Record 1, former Record 4 is now Record 2, and former Record 5 is now Record 3, as reflected by the numerical attribute values "1", "2", and "3" for first ordering attribute 18a, respectively. Note that attribute values 17v for second ordering attribute 18c still correspond to the original row labels (here, depicted as row labels "L2", "L4", and "L5", for the reordered Record 1, Record 2, and Record 3, respectively.

Dataframe component 114 may be configured to generate, create, and/or modify dataframes. For example, dataframe component 114 may create a dataframe, e.g., dataframe 15b as depicted in FIG. 5, based on a particular relation, such as second relation 17b in FIG. 4D. Dataframe component 114 may create a particular dataframe based on a particular relation that includes a two-dimensional table of columns and rows containing the same dataframe values as values contained in a set of remaining records included in that particular relation. Additionally, that particular dataframe may include a set of row labels based on one or more remaining additional ordering attributes (e.g., the second ordering attribute) of that particular relation. In other words, this set of row labels may be populated using attribute values for the second ordering attribute. Additionally, that particular dataframe may include a set of column labels based on the set of remaining attributes of that particular relation. In some implementations, creating that particular dataframe includes re-ordering the rows of the two-dimensional table based on the set of remaining attribute values of the first ordering attribute of the particular relation.

By way of non-limiting example, FIG. 5 illustrates second dataframe 15b that is based on second relation 17b in FIG. 4D, which includes table 15t (which may be different from first dataframe 15a) with two dimensions of dataframe positions that contain dataframe values. For example, dataframe position [4,1] is depicted as having dataframe value "0.5", dataframe position [4,2] has dataframe value "0.3", and dataframe position [5,1] has dataframe value "F". Similarly, dataframe positions [2, 2 to 3] are depicted as having dataframe values "g" and "b", respectively. Additionally, table 15t as depicted has a set of row labels 15r such that Row 1, Row 2, and Row 3 have row labels "L2", "L4", and "L5", respectively (taken from the attribute values for second ordering attribute 18c of second relation 17b in FIG. 4D). Storage component 108 may be configured to store dataframe 15b (e.g., in electronic storage 130, or in data warehouse 139) during and/or after activity by dataframe component 114.

Presentation component 116 may be configured to present information to one or more users, e.g., through one or more user interfaces 125. The presented information may include at least a portion of one or more dataframes and/or one or more relations. For example, presentation component 116 may present a portion of second dataframe 15b to a user. For example, the presented information may include the result of one or more queries or operations.

Referring to FIG. 1, user interfaces 125 may be configured to facilitate interaction between users 123 and system 100, and/or between users 123 and client computing platforms 104. For example, user interfaces 125 may provide an interface through which users 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100.

Referring to FIG. 1, in some implementations, components of system 100, client computing platform(s) 104, data warehouse 139, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes operative linking via some other communication media.

A given client computing platform 104 may include one or more processors configured to execute computer program components. The computer program components may be configured to enable an expert or user associated with the given client computing platform 104 to interface with system 100, data warehouse 139, and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 138 may include sources of information outside of system 100, external entities participating with system 100, external providers of computation and/or storage services (e.g., a server external to system 100), external providers of relevant information, and/or other resources. In some implementations, some or all of the functionality attributed herein to external resources 138 may be provided by resources included in system 100. In some implementations, one or more external resources 138 may provide services and/or information to other components of system 100, including but not limited to computational services, storage services, information pertaining to particular dataframes, information pertaining to particular relations, and/or other information.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together.

Electronic storage 130 may comprise non-transitory storage media that electronically stores information. The electronic storage media may include one or both of system storage that is provided integrally (i.e., substantially non-removable) with a corresponding server and/or removable storage that is removably connectable to the corresponding server via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by corresponding processor(s), information received from corresponding server(s), information received from client computing platform(s) 104, and/or other information that enables server(s) 102 to function as described herein. Electronic storage 130 may also be referred to as electronic memory 130.

Data warehouse 139 may be configured to digitally store information used by system 100. In some implementations, electronic storage 130 may be maintained in data warehouse 139. In some implementations, dataframes 15 and/or relations 17 may be stored in data warehouse 139. In some implementations, meta-data pertaining to dataframes 15 and/or relations 17 may be stored in electronic storage 130 and/or at client computing platforms 104 while dataframes 15 and/or relations 17 are stored at, maintained at, and/or performed on at data warehouse 139.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, and/or 116, and/or other components. Processor(s) 132 may be configured to execute components 108, 110, 112, 114, and/or 116, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components. In some implementations, one or more processors may be included in data warehouse 139.

It should be appreciated that although components 108, 110, 112, 114, and/or 116 are illustrated in FIG. 1 as being implemented within a single processing unit, this is exemplary. In implementations in which processor(s) 132 and/or processor(s) 132 include multiple processing units, one or more of components 108, 110, 112, 114, and/or 116 may be implemented remotely from the other components. The description of the functionality provided by the different components 108, 110, 112, 114, and/or 116 described below is for illustrative purposes only, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 132 may be configured to execute one or more additional components that may perform some or all of the functionality attributed below to one of components 108, 110, 112, 114, and/or 116.

Figure 2:
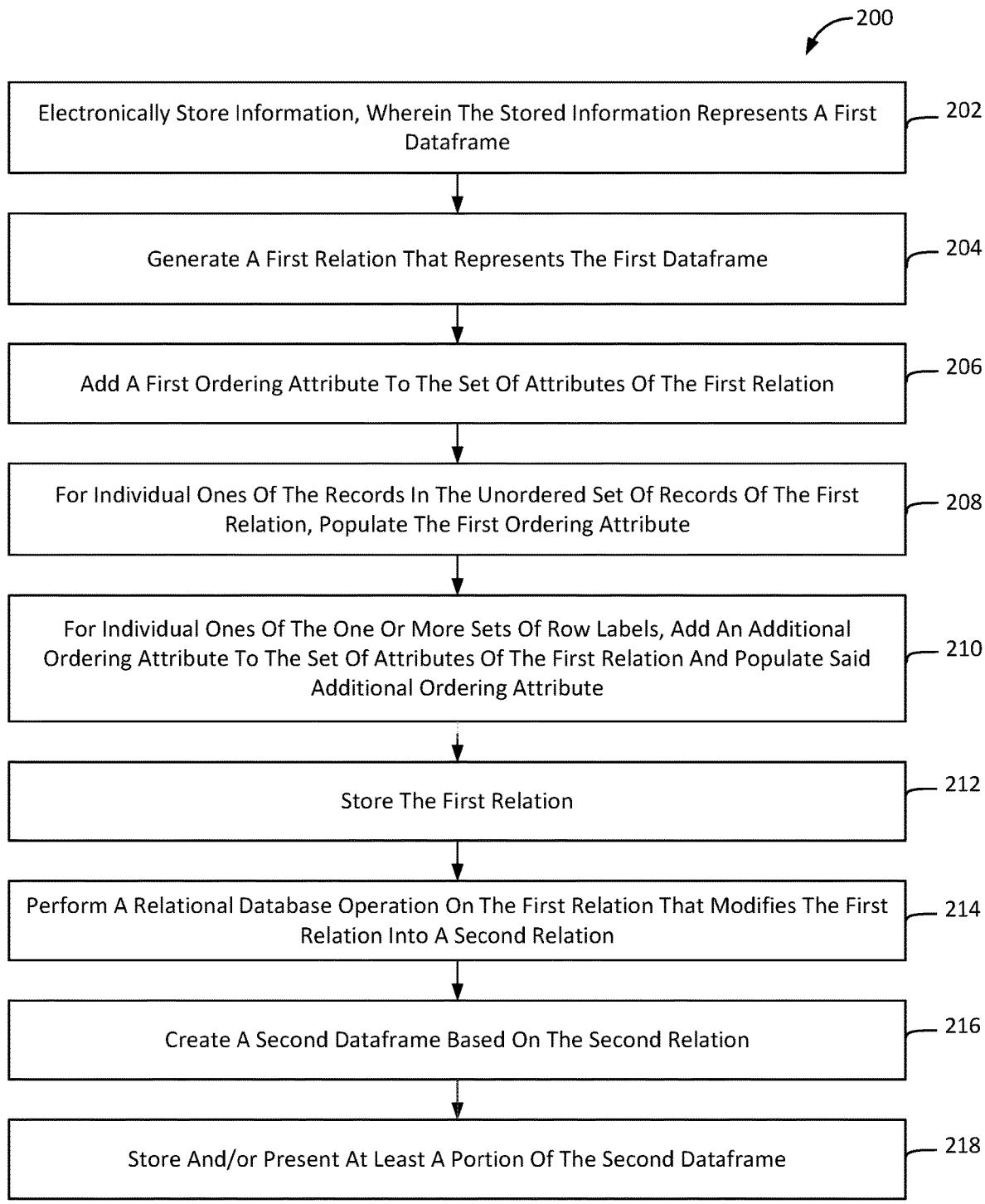
FIG. 2 illustrates a method of converting dataframes to relational databases and/or vice versa, in accordance with one or more implementations.

FIG. 2 illustrates a method 200 of converting dataframes to relational databases and back to other dataframes, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, information is stored electronically. The stored information represents a first dataframe. The first dataframe includes a two-dimensional, ordered, table of dataframe table positions that contain dataframe values. The two dimensions include a first dimension of columns and a second dimension of rows. The first dataframe further includes one or more sets of row labels and a set of column labels. The rows are ordered according to a row ordering. In some embodiments, operation 202 is performed by a storage component the same as or similar to storage component 108 (shown in FIG. 1 and described herein).

At an operation 204, a first relation is generated that represents the first dataframe, the first relation having a first schema that defines a set of attributes and a corresponding set of attribute types. Attribute values of individual ones of the set of attributes have a corresponding attribute type from the corresponding set of attribute types. The first relation includes an unordered set of records having the set of attributes. Individual records correspond to individual rows of the first dataframe such that the attribute values within the individual records are determined from the dataframe values contained in corresponding rows of the first dataframe. The set of attributes corresponds to the set of column labels of the first dataframe. The corresponding set of attribute types corresponds to the set of column domains of the first dataframe. In some embodiments, operation 204 is performed by a relation component the same as or similar to relation component 110 (shown in FIG. 1 and described herein).

At an operation 206, a first ordering attribute is added to the set of attributes of the first relation. The first ordering attribute has a numerical type. In some embodiments, operation 206 is performed by a relation component the same as or similar to relation component 110 (shown in FIG. 1 and described herein).

At an operation 208, for individual ones of the records in the unordered set of records of the first relation, the first ordering attribute is populated with numbers such that attribute values of the first ordering attribute are ordered according to the row ordering. In some embodiments, operation 208 is performed by a relation component the same as or similar to relation component 110 (shown in FIG. 1 and described herein).

At an operation 210, for individual ones of the one or more sets of row labels, an additional ordering attribute is added to the set of attributes of the first relation and populated with labels that correspond to row labels of the one or more sets of row labels. In some embodiments, operation 210 is performed by a relation component the same as or similar to relation component 110 (shown in FIG. 1 and described herein).

At an operation 212, the first relation is stored. In some embodiments, operation 212 is performed by a storage component the same as or similar to storage component 108 (shown in FIG. 1 and described herein).

At an operation 214, a relational database operation is performed on the first relation that modifies the first relation into a second relation by removing at least one record or by removing at least one attribute from the first relation. The second relation has a second schema that defines a second set of remaining attributes and a second corresponding set of remaining attribute types. A second set of remaining attribute values of the second set of remaining attributes have remaining corresponding attribute types from the second corresponding set of remaining attribute types. The second relation includes a second set of remaining records having the second set of remaining attributes. In some embodiments, operation 214 is performed by an operation component the same as or similar to operation component 112 (shown in FIG. 1 and described herein).

At an operation 216, a second dataframe is created based on the second relation. The second dataframe includes (i) a second two-dimensional table of columns and rows containing the same dataframe values as values contained in the second set of remaining records included in the second relation, (ii) a second set of row labels based on one or more remaining additional ordering attributes of the second relation, and (iii) a set of column labels based on the second set of remaining attributes of the second relation. Creating the second dataframe includes re-ordering the rows of the second two-dimensional table based on the second set of remaining attribute values of the first ordering attribute of the second relation. In some embodiments, operation 216 is performed by a dataframe component the same as or similar to dataframe component 114 (shown in FIG. 1 and described herein).

At an operation 218, at least a portion of the second dataframe is stored and/or presented. In some embodiments, operation 218 is performed by a storage component and/or a presentation component the same as or similar to storage component 108 and/or presentation component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to convert dataframes to relational databases and back to other dataframes, the system comprising:

electronic storage configured to electronically store information, wherein the stored information represents a first dataframe, wherein the first dataframe includes a two-dimensional, ordered, table of table positions, wherein individual ones of the table positions contain dataframe values, wherein the two dimensions include a first dimension of columns and a second dimension of rows, wherein the first dataframe further includes one or more sets of row labels and a set of column labels, and wherein the rows are ordered according to a row ordering; and one or more processors configured by machine-readable instructions to:

generate a first relation that represents the first dataframe, the first relation having a first schema that defines a set of attributes and a corresponding set of attribute types, wherein attribute values of individual ones of the set of attributes have a corresponding attribute type from the corresponding set of attribute types, and wherein the first relation includes an unordered set of records having the set of attributes, wherein individual records correspond to individual rows of the first dataframe such that the attribute values within the individual records are determined from the dataframe values contained in corresponding rows of the first dataframe, wherein the set of attributes corresponds to the set of column labels of the first dataframe, and wherein the corresponding set of attribute types corresponds to a set of column domains of the first dataframe;

add a first ordering attribute to the set of attributes of the first relation, wherein the first ordering attribute has a numerical type, for individual ones of the records in the unordered set of records of the first relation, populate the first ordering attribute with numbers such that attribute values for the first ordering attribute are ordered according to the row ordering;

for individual ones of the one or more sets of row labels, add an additional ordering attribute to the set of attributes of the first relation and populate said additional ordering attribute with labels that correspond to row labels of the one or more sets of row labels;

store the first relation;

perform a relational database operation on the first relation that modifies the first relation into a second relation by removing at least one record or by removing at least one attribute from the first relation, wherein the second relation has a second schema that defines a second set of remaining attributes and a second corresponding set of remaining attribute types, wherein a second set of remaining attribute values of the second set of remaining attributes have remaining corresponding attribute types from the second corresponding set of remaining attribute types, and wherein the second relation includes a second set of remaining records having the second set of remaining attributes;

create a second dataframe based on the second relation, wherein the second dataframe includes:

(i) a second two-dimensional table of columns and rows containing the same dataframe values as values contained in the second set of remaining records included in the second relation, (ii) a second set of row labels based on one or more remaining additional ordering attributes of the second relation, and (iii) a set of column labels based on the second set of remaining attributes of the second relation, wherein creating the second dataframe includes re-ordering the rows of the second two-dimensional table based on the second set of remaining attribute values of the first ordering attribute of the second relation; and store and/or present at least a portion of the second dataframe.

2. The system of claim 1, wherein the row ordering of the first dataframe is implicit.

3. The system of claim 1, wherein an attribute type of the first ordering attribute is integer.

4. The system of claim 1, wherein the one or more processors are further configured to:

responsive to removing the at least one record from the first relation, reorder the second set of remaining records such that the second set of remaining attribute values for the first ordering attribute are ordered according to the row ordering with exception of the at least one record that has been removed.

5. The system of claim 1, wherein the relational database operation conform to a Structured Query Language (SQL) standard.

6. The system of claim 1, further comprising a data warehouse configured to digitally store data, wherein the electronic storage is maintained in the data warehouse, and wherein the relational database operation is performed at the data warehouse.

7. The system of claim 6, wherein the one or more processors are further configured to:
store the second dataframe in the data warehouse.

8. The system of claim 1, wherein performance of the relational database operation on the first relation adds multiple additional attributes and multiple corresponding attribute types, wherein the one or more processors are further configured to:
responsive to adding the multiple attributes, populate values contained in the second set of remaining records for the multiple attributes.

9. The system of claim 1, wherein the one or more processors are further configured to:
effectuate a presentation of the portion of the second dataframe on a user interface of a client computing platform.

10. The system of claim 1, wherein the first dataframe includes a set of additional row labels, such that the first relation includes a second additional ordering attribute that is populated with the set of additional row labels, and wherein the second dataframe includes an additional set of row labels based on remaining attribute values for the second additional ordering attribute of the second relation.

11. A method of converting dataframes to relational databases and back to other dataframes, the method comprising:
electronically storing information, wherein the stored information represents a first dataframe, wherein the first dataframe includes a two-dimensional, ordered, table of dataframe table positions that contain dataframe values, wherein the two dimensions include a first dimension of columns and a second dimension of rows, wherein the first dataframe further includes one or more sets of row labels and a set of column labels, and wherein the rows are ordered according to a row ordering;
generating a first relation that represents the first dataframe, the first relation having a first schema that defines a set of attributes and a corresponding set of attribute types, wherein attribute values of individual ones of the set of attributes have a corresponding attribute type from the corresponding set of attribute types, and wherein the first relation includes an unordered set of records having the set of attributes, wherein individual records correspond to individual rows of the first dataframe such that the attribute values within the individual records are determined from the dataframe values contained in corresponding rows of the first dataframe, wherein the set of attributes corresponds to the set of column labels of the first dataframe, and wherein the corresponding set of attribute types corresponds to the set of column domains of the first dataframe;
adding a first ordering attribute to the set of attributes of the first relation, wherein the first ordering attribute has a numerical type,
for individual ones of the records in the unordered set of records of the first relation, populating the first ordering attribute with numbers such that attribute values for the first ordering attribute are ordered according to the row ordering;
for individual ones of the one or more sets of row labels, adding an additional ordering attribute to the set of attributes of the first relation and populating said additional ordering attribute with labels that correspond to row labels of the one or more sets of row labels;
storing the first relation;
performing a relational database operation on the first relation that modifies the first relation into a second relation by removing at least one record or by removing at least one attribute from the first relation, wherein the second relation has a second schema that defines a second set of remaining attributes and a second corresponding set of remaining attribute types, wherein a second set of remaining attribute values of the second set of remaining attributes have remaining corresponding attribute types from the second corresponding set of remaining attribute types, and wherein the second relation includes a second set of remaining records having the second set of remaining attributes;
creating a second dataframe based on the second relation, wherein the second dataframe includes:
(i) a second two-dimensional table of columns and rows containing the same dataframe values as values contained in the second set of remaining records included in the second relation,
(ii) a second set of row labels based on one or more remaining additional ordering attributes of the second relation, and
(iii) a set of column labels based on the second set of remaining attributes of the second relation, wherein creating the second dataframe includes re-ordering the rows of the second two-dimensional table based on the second set of remaining attribute values of the first ordering attribute of the second relation; and
storing and/or presenting at least a portion of the second dataframe.

12. The method of claim 11, wherein the row ordering of the first dataframe is implicit.

13. The method of claim 11, wherein an attribute type of the first ordering attribute is integer.

14. The method of claim 11, further comprising:
responsive to removing the at least one record from the first relation, reordering the second set of remaining records such that the second set of remaining attribute values for the first ordering attribute are ordered according to the row ordering with exception of the at least one record that has been removed.

15. The method of claim 11, wherein the relational database operation conform to a Structured Query Language (SQL) standard.

16. The method of claim 11, wherein the relational database operation is performed at a data warehouse that electronically stores the information, including the first relation and the second relation.

17. The method of claim 16, further comprising:
storing the second dataframe in the data warehouse.

18. The method of claim 11, wherein performance of the relational database operation on the first relation adds multiple additional attributes and multiple corresponding attribute types, the method further comprising:
responsive to adding the multiple attributes, populating values contained in the second set of remaining records for the multiple attributes.

19. The method of claim 11, further comprising:
effectuating a presentation of the portion of the second dataframe on a user interface of a client computing platform.

20. The method of claim 11, wherein the first dataframe includes a set of additional row labels, such that the first relation includes a second additional ordering attribute that is populated with the set of additional row labels, and wherein the second dataframe includes an additional set of row labels based on remaining attribute values for the second additional ordering attribute of the second relation.

* * * * *